United States Patent [19]
Fujan et al.

[11] Patent Number: 5,308,105

[45] Date of Patent: May 3, 1994

[54] STEERABLE DUAL REAR AXLE SYSTEM FOR LARGE VEHICLES

[75] Inventors: Steven J. Fujan; Frederick W. Loeber, both of Tulsa, Okla.

[73] Assignee: Terex Corporation, Green Bay, Wis.

[21] Appl. No.: 849,154

[22] Filed: Mar. 9, 1992

Related U.S. Application Data

[63] Continuation-in-part of Ser. No. 805,531, Dec. 11, 1991.

[51] Int. Cl.$^5$ ................................. B60G 5/00
[52] U.S. Cl. .................... 280/676; 280/81.5; 180/24.01
[58] Field of Search .......... 280/676, 683–685, 280/687, 688, 81.5, 81.6; 180/22, 24.01, 24.11

[56] References Cited

U.S. PATENT DOCUMENTS

| | | | |
|---|---|---|---|
| 1,565,527 | 12/1925 | Templin | 180/24.11 |
| 1,761,135 | 6/1930 | Le Moon | 280/680 |
| 2,613,954 | 10/1952 | Avila | 180/22 |
| 3,147,024 | 9/1964 | Brockman | 280/683 |
| 4,717,170 | 1/1988 | Mounier-Poulat et al. | 180/24.01 |
| 5,088,570 | 2/1992 | Loeber | 180/24.01 |
| 5,163,700 | 11/1992 | Loeber | 280/676 |

FOREIGN PATENT DOCUMENTS 0082879  4/1988  Japan ................... 280/676

Primary Examiner—Margaret A. Focarino
Assistant Examiner—Paul Dickson
Attorney, Agent, or Firm—Head and Johnson

[57] ABSTRACT

A steerable dual rear axle system for large vehicles in which the vehicle has a frame, and the axle system includes a forward axle housing, a draft arm having one arm affixed to the forward axle housing and the other pivotally affixed to the vehicle frame, a rearward axle housing spaced from the forward axle housing, an axle extending through both axle housings having wheels and tires thereon, an upper linkage having one end pivotally attached to the upper portion of the forward axle housing and the other end pivotally attached to the upper portion of the rearward axle housing, a lower linkage having one end pivotally attached to the lower portion of the forward axle housing and the other end pivotally attached to the lower portion of the rearward axle housing so that the axle housings are supported in spaced apart relationship with the axle housings being independently free to move in vertical planes, compressible strut members extending between the axle housings and the frame for spring supporting the frame, and a hydraulically actuatable cylinder-piston member extending between the forward and rearward axle housings for steerably pivoting the rearward relative to the forward axle housing.

17 Claims, 3 Drawing Sheets

STEERABLE DUAL REAR AXLE SYSTEM FOR LARGE VEHICLES

This is a continuation-in-part of copending application Ser. No. 07/805,531 filed on Dec. 11, 1991, pending.

BACKGROUND OF THE INVENTION

This invention relates to a dual axle system for large vehicles and in one embodiment in which the system is steerable. The invention is particularly useful for large off-road vehicles, such as trucks used for carrying extremely large loads. These type of trucks are customarily used in surface and open pit mining, earth moving and so forth. Such large off-road trucks are required not only to carry large loads but to move at fairly high speeds and typically over rough ground, that is, they do not typically travel on paved roads. Even in projects where some portions of the vehicle travel is over road surfaces that are maintained, the usual application includes at least some surfaces that are not maintained. In other words, these large off-road trucks must carry heavy loads at fairly high speeds over uneven terrain. For this reason, the axle arrangement and suspension system must be arranged to achieve two basic objectives, that is, support extremely heavy loads and, second, to provide suspension and mounting systems for the axle assemblies that support such heavy loads without transferring to the vehicle frame excessive shock from uneven terrain.

For reference to types of vehicles to which the present disclosure relates, reference may be had to U.S. patent application Ser. No. 07/650,442, entitled "Steerable Rear Dual Axle System For Large Trucks" now U.S. Pat. No. 5,088,570. Such disclosure describes a dual axle system for large trucks, as does the present disclosure. The dual axle system described in application Ser. No. 07/650,442 is steerable, that is, provision is made for changing the angular relationship between dual rear axles to coordinate with the vehicle front steering system. The present disclosure also provides a system having a forward and a rearward rear axle in which the rearward rear axle is steerable.

It is an object of this disclosure to provide an improved dual rear axle assembly for large vehicles that, in one embodiment, is steerable. More particularly, an object of this invention is to provide a dual rear axle assembly specifically useful for axles that include large cylindrical axle housings designed for mounting therein electric drive systems, with axles extending from the electric drive systems. An important aspect of this disclosure is the provision of a dual rear axle assembly for large trucks including forward and rearward axle housings wherein the axle housings are supported in a manner to permit independent motion in vertical planes of the axles. In a preferred embodiment of the dual axle system one rear axle is steerable relative to the other.

SUMMARY OF THE INVENTION

A dual rear axle system for large vehicles includes a vehicle frame with a longitudinal axis in the direction of normal travel. The frame has a front end and a rear end.

A forward rear axle housing has an axis and opposed ends and has an upper portion and a lower portion. The forward axle housing typically is formed of a relatively large diameter cylindrical member particularly adaptable for mounting therein electric drive systems.

A draft arm has one end affixed to the forward axle housing and the other end pivotally affixed to the vehicle frame in the direction toward the frame front end. In this manner the forward axle housing is supported so that it can pivot in a vertical plane that is perpendicular to the frame longitudinal axis.

A rearward axle housing is provided that may be substantially identical to the forward axle housing. The rearward axle housing has opposed ends and upper and lower portions and is spaced from the forward axle housing. In one embodiment the axii of the forward and rearward axle housings are parallel to each other and in vertical planes perpendicular to the vertical plane of the frame longitudinal axis. In another embodiment the rearward rear axle is steerably pivotal relative to the forward rear axle.

An axle rotatably extends from each end of each of the forward and rearward axle housings, and the axle housings include means providing rotational motive or braking forces to the axles for moving or stopping the vehicle on which the dual rear axle assembly is used.

Wheels are mounted on the outer ends of the axles and the wheels may be singular or dual. Thus with dual axles and dual wheels at the end of each axle, the assembly supports eight wheels and thereby eight tires on the wheels.

An upper linkage has opposed ends, one end being pivotally attached to the upper portion of the forward axle housing and the other end pivotally attached to the upper portion of the rearward axle housing in a vertical plane centrally between the axles opposed ends.

A lower linkage has opposed ends, one end being pivotally attached to the lower portion of the forward axle housing and the other end being pivotally attached to the lower portion of the rearward axle housing. In the preferred arrangement herein described, the upper linkage may be formed of a link affixed to both the forward and rearward axle housings intermediate their ends, and the lower linkage is in the form of a link also affixed to the forward and rearward axle housings intermediate their ends, the upper and lower linkages being in substantially the same vertical plane.

Spring support is provided between the axle housings and the frame. The spring support may be in the form of compressible strut members extending between the vehicle frame and the axle housings.

A first panhard bar is pivotally attached at one end to the frame and the other end to the forward axle housing and is supported in a plane of the forward axle housing axis that is perpendicular the frame longitudinal axis. In like manner, a second panhard bar pivotally extends between the frame and the rearward axle housing in the plane of the rearward axle housing axis. The panhard bar serves to maintain the dual axles in proper position beneath the frame but allows free vertical movement of the axle housings with respect to the frame and steerable pivotation of the rearward axle housing relative to the forward axle housing.

A better understanding of the invention will be obtained from the following description of the preferred embodiment, taken in conjunction with the attached drawings.

DESCRIPTION OF THE DRAWINGS

FIG. 2 shows struts employed for a spring mount system to which the vehicle frame is supported by the dual rear axle assembly.

FIG. 4 is substantially identical to FIG. 2 except that it shows an alternate embodiment in which the rearward axle housing is pivotal with respect to the forward axle housing. Like FIG. 2, the tires are shown in dotted outline and the axle housings are shown without the axles extending therefrom.

DESCRIPTION OF THE PREFERRED EMBODIMENTS

Figure 1:
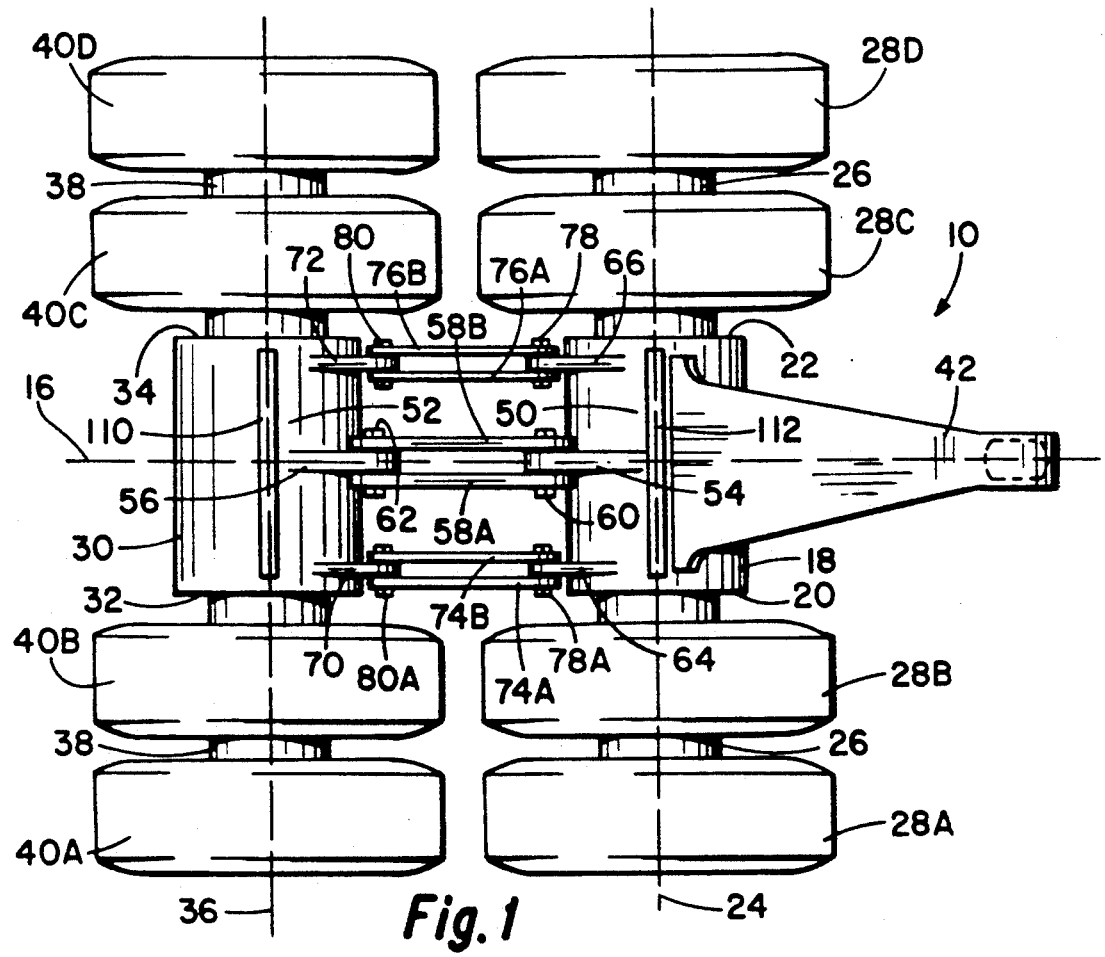
FIG. 1 is a top plan view of a dual rear axle assembly for use as a part of a large off-road vehicle showing only the assembly without the vehicle frame and without the spring suspension system.

Referring to the drawings, the rear dual axle assembly for large vehicles is indicated generally by the numeral 10. Such assembly is used with a truck frame illustrated diagrammatically by longitudinal members 12 and 14 that are shown in highly simplified arrangement for exemplary purposes only. The frame members 12 and 14 extend longitudinally and the frame has a longitudinal axis 16, as seen in FIG. 1, extending in the forward and rearward direction in the vehicle normal direction of travel. Frame members 12 and 14 are exemplary since vehicle frames, particularly for large heavy-load carrying vehicles, are an extremely complex and highly engineered piece of equipment and are usually contoured according to the load carrying structure to be used with the truck, such as a dump truck or the like. Frame members 12 and 14 are illustrated merely to indicate that the dual rear axle assembly 10 of this disclosure is used with a frame structure.

The dual rear axle assembly includes a forward axle housing 18 having opposed ends 20 and 22. The forward axle housing has an axis 24 as seen in FIG. 1. In the illustrated arrangement for practicing this invention, forward axle housing 18 is a relatively large diameter tubular member of the type that is adaptable to receive therein electric motor drive systems that support a forward rear axle 26 that extends from the opposite ends 20 and 22 of the axle housing. Axle 26 supports wheel assemblies having tires 28A through 28D. Axle 26 and tires 28A through 28D rotate about axis 24.

The dual axle assembly 10 further includes a rearward axle housing 30 that is substantially a duplicate of forward axle housing 18. The rearward axle housing has ends 32 and 34, and has an axis 36. The rearward axle housing supports a rearward rear axle 38 that extends from both ends 32 and 34 of rearward axle housing 30. Mounted on rearward rear axle 38 are wheel structures and tires 40A through 40D. Thus, it is seen that by use of dual tires and dual rear axles the assembly supports eight wheels and tires, however, the invention could be practiced with single rather than dual wheels and tires so that only four wheels and tires are employed. Further, the invention can be used whether or not the forward and the rearward axle housings 18 and 30 are large cylindrical members, as illustrated, or are of the type of axle housings that are not required to support electric drive means therein. That is, the principles of this invention apply whether or not axle housings 18 and 30 support integral drive means therein, however, the invention is particularly applicable to the arrangement illustrated wherein the axle housings are of large diameter.

A draft arm 42 has one end 44 affixed to the forward axle housing 18. The forward end of the draft arm has an opening 46 therein for pivotally receiving a frame cross-member structure, not shown, that is supported by a downwardly extending bracket 48 forming a part of the vehicle frame. The draft arm 42 may be of the type illustrated and described in U.S. Pat. No. 4,629,211 entitled, "Frame And Axle For Heavy Duty Trucks." A nose cone bearing is used to receive opening 46 in the draft arm, and for reference to an improved type of nose cone bearing arrangement, see co-pending U.S. application Ser. No. 07/624,968 entitled "Nose Cone Bearing Arrangement" now U.S. Pat. No. 5,085,520.

The draft arm 42 is preferably a fabricated structural member of generally triangular configuration, as shown in the plan view of FIG. 1, in which the rearward end 44 is wide at the point of attachment to the forward axle housing. In this manner, forward axle housing 18 is secured to vehicle frame 12, 14 so that motive force or braking force can be applied from the dual rear axle assembly 10 to the truck frame.

Front axle housing 18 has an upper portion 50 and in like manner, rearward axle housing 30 has an upper portion 52. Affixed to the axle housings at the upper portions 50 and 52 are brackets 54 and 56. Specifically, bracket 54 is affixed to upper portion 50 of forward axle housing 18, is spaced midway between axle housing ends 20 and 22, and extends rearwardly from the housing. Bracket 56 is affixed to upper portion 52 of rearward axle housing 30, extends in the forward direction and is placed intermediate axle housing ends 32 and 34. Thus, brackets 54 and 56 are in the same vertical plane of the rear axle assembly and are in the vertical plane of the vehicle frame longitudinal axis 16.

An upper linkage means is provided to pivotally interconnect brackets 54 and 56. This is accomplished by link arms 58A and 58B. The forward ends of link arms 58A and 58B pivotally connect to bracket 54, and the rearward ends pivotally connect to bracket 56. This pivotal connection is achieved by pins 60 and 62. Instead of the use of pins 60 and 62 link arms 58A and 58B may be connected by use of ball joints or other swivel-type joint connections.

Secured to the forward axle housing 18 adjacent first end 20 is a bracket 64 that is in a vertical plane. Bracket 64 extends from adjacent the forward axle housing bottom portion 66 upwardly in a vertical plane. In like manner, bracket 66 is affixed to the forward axle housing 18 adjacent end 22 and extends rearwardly in a vertical plane.

Rearward axle housing 30 has a bottom portion 68. A first bracket 70 is affixed to rearward axle housing 30 and extends forwardly in a vertical plane adjacent axle housing end 32. A second bracket 72 is affixed to rearward axle housing 30 adjacent end 34 and extends in a vertical plane.

Thus, brackets 66 and 72 extend toward each other in the same vertical plane and in like manner, brackets 64 and 70 are in the same vertical plane and extend toward each other. A lower linkage means is provided for interconnecting the pairs of brackets 64, 70 and 66, 72. This linkage means is illustrated in the form of link arms 74A and 74B that interconnect brackets 64 and 70, and link arms 76A and 76B that interconnect brackets 66 and 72. The interconnection between the link arms and the brackets is pivotal, that is, the interconnection allows free pivotation in a vertical plane and limited amount of pivotation in the horizontal plane and is exemplified by pins 78, 78A, 80 and 80A. Instead of pins, the pivotal connections between the brackets and the link arms may be by ball joints or other type of connections that permit spherical motion alignment under load.

Figure 2:
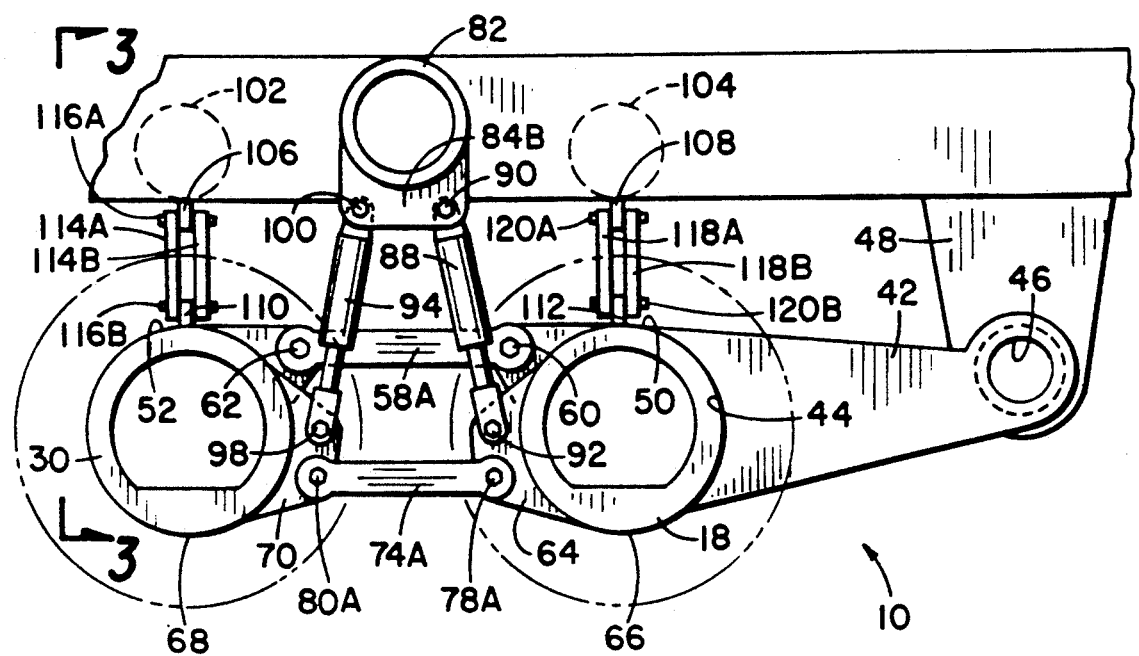
FIG. 2 is an elevational view of the dual axle assembly of FIG. 1 showing the tires in dotted outline and showing the axle housing without the axles extending therefrom.

The upper link arms 58A and 58B thereby extend essentially from the axle housing upper portions 50 and 52 while the lower link arms 74 and 76 generally extend from the axle housing lower portions 66 and 68 as best seen in FIG. 2.

The system of link arms 58, 74 and 76 interconnect the axle housings and maintain the axle housings in spaced apart relationship wherein the axii 24 and 36 of the axle housings are supported in vertical planes, but in which the axii can oscillate with respect to each other in their vertical planes.

Figure 3:
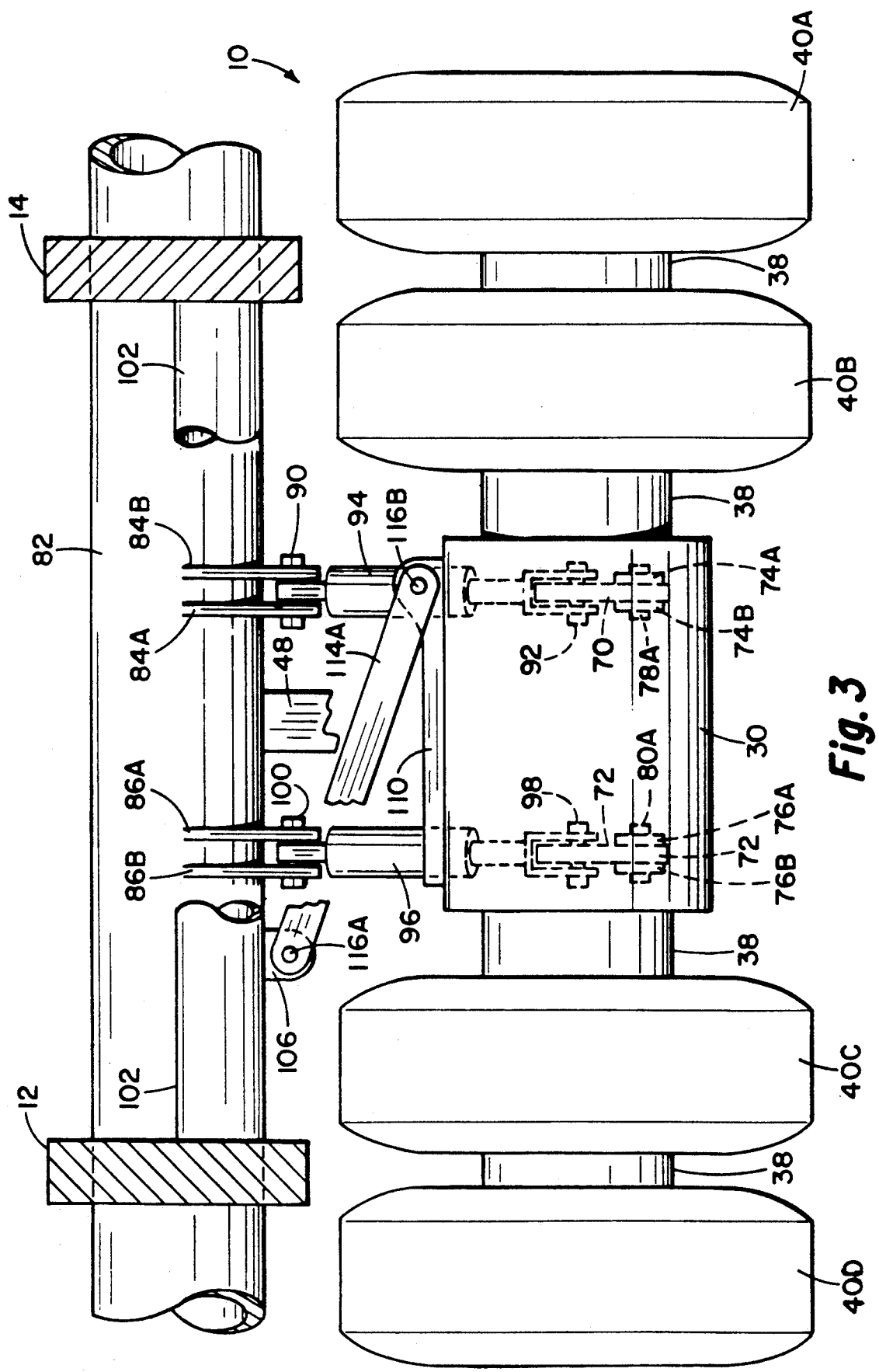
FIG. 3 is a rearward view as taken along the line 3—3 of FIG. 2 showing more details of the arrangement of the spring support system and of the panhard bar for maintaining the dual rear axle assembly in proper position below the truck frame. In this view the axles extending from the rear axle housing are shown with tires as mounted on wheels supported to the axles.

Means must be provided to spring support vehicle frame 12, 14 with respect to the dual rear axle assembly 10. This can be achieved in a variety of ways but in the illustrated and preferred arrangement, the frame has a cross member 82, as seen in FIGS. 2 and 3. The frame has downwardly extending brackets 84A and 84B that are spaced either side of the vertical plane of brackets 64 and 70 affixed to the axle housings. Similarly, the crossmember support has brackets 86A and 86B that extend downwardly to either side of the vertical plane for brackets 66 and 72 affixed to the rear axle housings. Extending between brackets 84A, 84B and bracket 64 is a spring support mechanism in the form of a strut assembly 88. The strut assembly is pivotally attached at its upper end by pin 90 to the vehicle frame and the lower end of strut assembly 88 is attached to bracket 64 by means of a pin 92. In like manner, a second strut member, not seen, extends from brackets 86A and 86B to bracket 66.

A pair of strut members 94 and 96 extend from brackets 84A, 84B and 86A and 86B to the rearward axle housing brackets 70 and 72.

Struts 88, 94 and 96 (as well as the one not seen) may be of the type as described in U.S. Pat. No. 4,863,147 issued Sep. 5, 1989 and entitled "Vehicle N2/Oil Suspension With External Damping Orifice Adjustment."

The pin that holds the lower end of strut 96 to bracket 72 is identified by the numeral 98, and the pin that holds the upper end of strut 96 to brackets 86A and 86B is identified by the numeral 100.

Draft arm 42 serves to maintain the dual rear wheel assembly 10 in proper position longitudinally beneath frame 12, 14 but some means is required to maintain the assembly in proper position laterally. This is achieved by the use of a pair of panhard bars. Extending between frame portions 12, 14 are supplementary cross members 102 and 104, 104 appears in dotted outline in only FIG. 2. FIG. 3 shows supplementary cross member 102 broken away to reveal more details of the assembly. The supplementary cross members 102 and 104 are illustrated as means of anchoring the panhard bars to the frame. Extending downwardly from cross member 102 is a bracket 106 and from cross member 104, a bracket 108 (see FIG. 2). Extending upwardly in the vertical plane of bracket 106 is a bracket 110 that is attached to rearward axle housing upper portion 52. In like manner, a bracket 112 extends upwardly from the forward axle housing upper portion 50. Bracket 112 is in the vertical plane of bracket 108.

Extending between brackets 106 and 110 is a rearward panhard bar made up of parallel lengths 114A and 114B that are pivotally supported by pins 116A and 116B. In like manner, a forward panhard bar consists of two lengths 118A and 118B pivotally supported at one end to bracket 108 by pin 102A and to bracket 112 by pin 120B. The forward and rearward panhard bars maintain the axle housings 18 and 30 in proper lateral position beneath the vehicle frame but permit free vertical displacement of the axle housings relative to the frame.

The dual rear axle assembly 10 has advantages over other known types of rear dual axle arrangements. First, the assembly is arranged in such a way that each of the four wheels or four sets of wheels, as illustrated, can rise and fall vertically irrespective of the displacement of the other three wheels or sets of wheels. In addition, each axle housing 18 and 30 can as a whole rise or fall vertically independently of the other axle housing. Further, the entire assembly is free to pivot in vertical planes perpendicular to the vehicle longitudinal axis.

A great advantage of the dual rear axle assembly 10 as herein described is its economy and simplicity. The use of upper link arms 58A, 58B and lower link arms 74A, 74B, 76A and 76B to interlink the forward and rearward axle housings is accomplished in a manner of utmost simplicity and economy of construction. While significant economy and simplicity of construction are achieved, the dual axle system also has other significant engineering advantages. One of the important aspects of the system is that it is self-counteracting with respect to ground forces, that is, the weight applied to forward axle housing 18 is reacted by rearward axle housing 30 and strut 88 (as well as the one not seen) rather than draft arm 42 and the nose cone bearing within opening 46. In the same way, weight applied to rearward axle housing 30 is reacted by the forward axle housing 18 and struts 94, 96. This characteristic of the assembly to self counteract greatly simplifies the connection of the assembly to the frame and reduces stress, strain and wear on the connections between the axle assembly and the frame.

Figure 4:
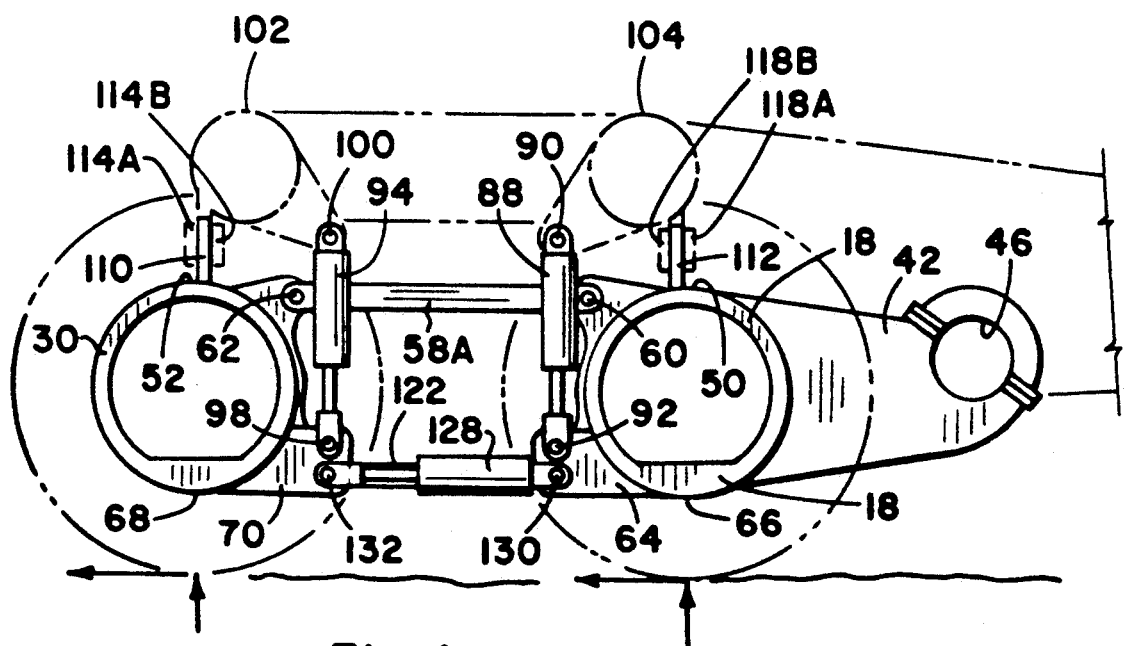
FIG. 4 is an elevational view of the dual axle assembly of this disclosure showing an alternate embodiment in which the dual axle assembly is steerable.
Figure 5:
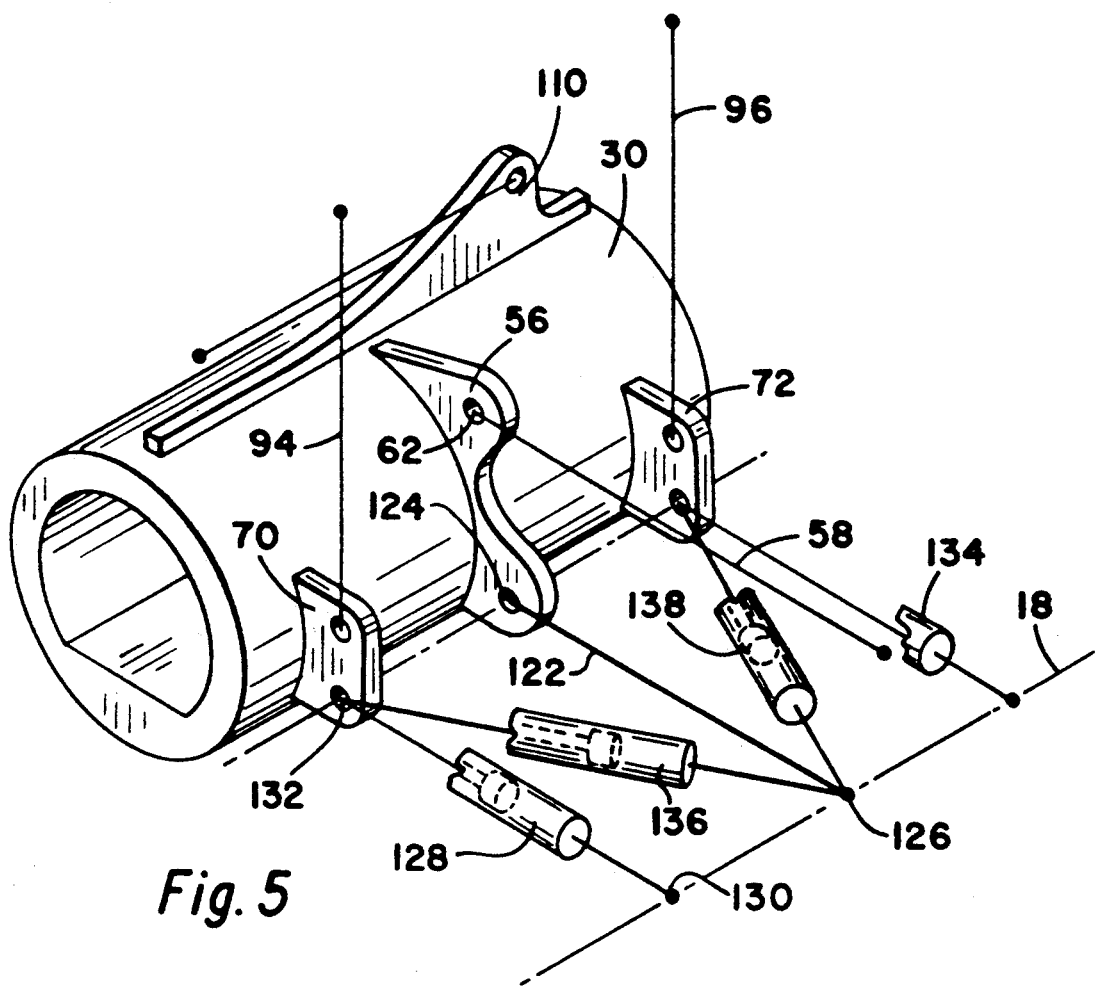
FIG. 5 is a diagrammatic illustration showing the rear dual axle housing and showing one means for pivoting the dual rear axle housing relative to the forward axle housing which is represented only by a line indicating a rotational axis of the axle and wheels that are supported by the forward axle housing, and showing hydraulically actuatable cylinder-piston members arranged for pivoting the rear axle housing with respect to the forward axle housing.

The improved embodiment of this disclosure provides an arrangement wherein the dual axle system heretofore described is made steerable and an illustration of an embodiment for accomplishing this result is shown in FIGS. 4 and 5. In FIGS. 4 and 5 the elements that are essentially the same as described with reference to FIGS. 1 through 3 are provided with the same numbers. In the embodiment of FIGS. 4 and 5, the dual axle system is substantially the same as that described with reference to FIGS. 1 through 3 except that instead of utilizing spaced apart lower link arms 74A, 74B, 76A and 67B in the pivotal arrangement of FIGS. 4 and 5 only a single, lower link arm 122 is employed. The lower link arm 122 is partially seen in FIG. 4 and is represented by the axis thereof in FIG. 5. The lower link arm 122 is in substantially the vertical plane of the upper link arms 58A and 58B of the previously described embodiment, that is, both upper link arm 58 and lower link arm 122 are substantially in the vertical plane of the vehicle longitudinal axis 16 as seen in FIG. 1. The lower link arm 122 is pivotally secured to lower portion of bracket 56 of the rearward axle housing 30 at an attachment point 124, the attachment point being on a lower extension of bracket 56. The lower link arm 122 is secured to an attachment point 126 on the lower portion of bracket 54 attached to forward axle housing 18.

This arrangement provides a parallelogram system in which the forward and rearward axle housings are independently free to pivot in a vertical plane of the axial axii and in which the rearward axle housing 30 is free to pivot in a plane of a horizontal axis of the rearward axle relative to the forward axle housing 18. The upper and lower link arms 58 and 122 transmit rotational torque of the axle housings 18 and 30 to each other and thus to the draft arm 42 as seen in FIG. 4.

By placement of both the upper and lower linkages between the forward and rearward axle housing centrally between the axle housings opposed ends, the rearward axle housing is then free to pivot with respect to the forward axle housing so that the dual rear axle assembly is steerable. To achieve steering action, means must be provided for pivoting rearward axle housing 30 with respect to the forward axle housing and this is preferably accomplished by hydraulic means exemplified by at least one cylinder-piston 128. The cylinder-piston 128, as seen in FIGS. 4 and 5, has a forward attachment point 130 secured to bracket 64 adjacent the bottom portion 66 of forward axle housing 18. The opposite end of cylinder-piston 128 is secured at an attachment point 132 to brackets 70 that, in turn, is affixed to rearward axle housing 30. It is not necessary that the cylinder-piston extend between the forward and rearward axle housings at the lower portions since the only important function of cylinder-piston 128 is to pivot the rearward axle housing relative to the forward axle housing and this can be accomplished regardless of the elevational position of the cylinder-piston.

In the illustrative embodiment of FIG. 5, the use of four cylinder-pistons are employed, any one of which could be used alone to cause the pivotation of the rearward axle housing with respect to the forward axle housing. In FIG. 5, a second cylinder-piston 134 is positioned between the forward and rearward axle housings near the end thereof opposite the end to which the first mentioned cylinder-piston 128 is attached. When both cylinder-pistons 128 and 134 are employed, it can been seen that when hydraulic energy is applied to extend the length of one of such cylinder-pistons the other cylinder-piston will be shortened in length so that they work conjointly but in opposite directions. In addition, a third cylinder-piston 136 and fourth cylinder-piston 138 can be employed affixed to an attachment point 126 of forward axle housing 18 and extending at angles to attach to brackets 70 and 72. The third and fourth cylinder-pistons 136 and 138 function to pivot the rearward axle housing by supplying hydraulic fluid to extend the length of one and shorten the length of the other. In the illustration of FIG. 5 all four of the cylinder-pistons can be employed simultaneously with hydraulic energy supplied to extend or contract the cylinders as required for steering action.

The configuration of the embodiment employing the arrangement of FIGS. 4 and 5 allows independent movement of the dual axles and also provides steering action of rearward axle housing 30. Provision of steering capabilities serves to reduce the minimum turning radius of the vehicle which employs this system and thereby increases its maneuverability. In addition, the provision for the dual steering rear axle also reduces the tendency for vehicle tires scuffing to thereby result in greater tire life. The arrangement of the system which provides for independent movement of the axles while still providing steerability will provide a better ride quality for vehicles employing the system.

The system allows independent movement of all tire positions, whether single or dual tires, and with simple and low cost components while also providing steering action of the rearward axle.

By placing the torque links, that is, upper link arm 58 and lower link arm 122, in a vertical plane at the center line of the vehicle, the system is inherently stable under symmetric driving and braking loads. The steering cylinders 128, 134, 136 and 138 will be under load only if the driving or braking load becomes asymmetric or during steering action.

If multiple steering cylinders, such as shown in FIG. 5, are mounted with their ends points co-linear with the end points of either the upper or lower link arms 58 or 122, then relative vertical movement of each axle as a whole will not force stroking of the cylinders, whether one steering cylinder is used or if multiple steering cylinders are used as illustrated in FIG. 5. The steering cylinder positions are totally independent of the suspension position. Stroking of the cylinders is not forced when the axles move independently and asymmetrically. This arrangement results in an improved control system and increased reliability.

While in this disclosure only forward and rearward axles are employed in the system, any number of rearward axles could be linked in series from the initial forward axle and each could be steerable, employing the system as described herein.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A steerable dual rear axle system for large vehicles comprising:
   a frame with a longitudinal axis in the direction of normal travel, the frame having a front end and a rear end;

a forward axle housing having an axis and opposed ends and having an upper portion and a lower portion;

a draft arm having one end affixed to said forward axle housing and the other end pivotally affixed to said frame in the direction towards said frame front end;

a rearward axle housing having an axis and opposed ends, the rearward axle housing being spaced from said forward axle housing and their axii being in vertical planes, the rearward axle housing having an upper portion and a lower portion;

axle means rotatably supported by both said forward and rearward axle housings;

wheel means secured to said axle means;

upper linkage means having opposed ends, one end being pivotally attached to said upper portion of said forward axle housing and the other end being pivotally attached to said upper portion of said rearward axle housing;

lower linkage means having opposed ends, one end being pivotally attached to said lower portion of said forward axle housing and the other end being pivotally attached to said lower portion of said rearward axle housing, said upper and lower linkage means being in a common vertical plane of said frame longitudinal axis intermediate said forward and rearward axles opposed ends;

means providing spring support between said forward and rearward axle housings and said frame to thereby transfer weight from said frame to said forward and rearward axle housings; and means of steerably pivoting said rearward axle housing relative to said forward axle housing.

2. A steerable dual rear axle system for large vehicles according to claim 1 wherein said upper linkage means is in the form of a single link arm, said one end being pivotally attached to said upper portion of said forward axle housing intermediate said opposed ends and said other end being pivotally attached to said upper portion of said rearward axle housing intermediate said opposed ends.

3. A steerable dual rear axle system for large vehicles according to claim 1 wherein said lower linkage means is in the form of a single lower link arm, the lower link arm being pivotally attached to said lower portions of said forward and rearward axle housings intermediate said opposed ends thereof.

4. A steerable dual axle system for large vehicles according to claim 1 wherein said means providing spring support between said forward and rearward axle housings and said frame includes:

a pair of spaced apart spring support means interposed between attachment points on said forward axle housing and said frame; and a second pair of spaced apart spring support means interposed between attachment points on said rearward axle housing and said frame.

5. A steerable dual rear axle system for large vehicles according to claim 4 wherein each said spring support means is in the form of a telescopically compressible strut member.

6. A steerable dual rear axle system for large vehicles according to claim 1 including:

an elongated panhard bar having first and second ends, the first end being pivotally connected to said forward axle housing, the second end being pivotally connected to said frame, said panhard bar being supported for pivotation in a vertical plane perpendicular to said frame longitudinal axis and serving to maintain said forward axle housing in vertical position below said frame.

7. A steerable dual rear axle system for large vehicles according to claim 6 including:

a second elongated panhard bar having first and second ends, the first end being pivotally connected to said rearward axle housing, the second end being pivotally connected to said frame, said second panhard bar being supported for pivotation in a vertical plane perpendicular to said frame longitudinal axis and serving to maintain said rearward axle housing in vertical position below said frame.

8. A steerable dual rear axle system for large vehicles according to claim 1 wherein said means of steerably pivoting said rearward axle housing relative to said forward axle housing comprises:

hydraulically actuatable cylinder-piston means.

9. A steerable dual rear axle system for large vehicles according to claim 8 wherein said hydraulically actuatable cylinder-piston means comprises:

a hydraulically actuatable cylinder-piston member having first and second ends, the first end being pivotally affixed to a first point of attachment on said forward axle housing and the second end being pivotally affixed at a second point of attachment adjacent one of said ends of said rearward axle housing.

10. A steerable dual rear axle system for large vehicles according to claim 9 including a second hydraulically actuatable cylinder-piston member having first and second ends, the first end being pivotally affixed to a first point of attachment on said forward axle housing and the second end being pivotally affixed at a second point of attachment adjacent the other of said ends of said rearward axle housing, the first and second cylinder-piston members functioning oppositely of each other to steerably pivot said rearward axle housing relative to said forward axle housing.

11. For use with a large vehicle having a frame, a steerable rear axle system comprising:

an assembly formed of a forward and a rearward axle housing each providing means for rotatably supporting an axle and wheel assemblies on the ends of the axles, each axle housing being in the form of a tubular member having opposed ends and an upper and a lower portion, the axle housings being spaced apart from each other;

upper linkage means having opposed ends, one end being pivotally attached to said upper portion of said forward axle housing and the other end being pivotally attached to said upper portion of said rearward axle housing;

lower linkage means having opposed ends, one end being pivotally attached to said lower portion of said forward axle housing and the other end being pivotally attached to said lower portion of said rearward axle housing, said lower linkage means being in the form of a single lower link arm, the lower link arm being pivotally attached to said lower portions of said forward and rearward axle housing midway between said opposed ends thereof;

means to pivotally couple said assembly below a vehicle frame;

means to provide spring support between said assembly and a vehicle frame; and means to steerably pivot said rearward axle housing relative to said forward axle housing.

12. A steerable dual rear axle assembly for large vehicles according to claim 11 wherein said upper linkage means is in the form of a single link arm, said one end being pivotally attached to said upper portion of said forward axle housing intermediate said opposed ends and said other end being pivotally attached to said upper portion of said rearward axle housing intermediate said opposed ends.

13. A steerable dual rear axle assembly for large vehicles according to claim 11 including:
an elongated panhard bar having first and second ends, the first end being pivotally connected to said forward axle housing, the second end being pivotally connected to a vehicle frame, said panhard bar being supported for pivotation in a vertical plane and serving to maintain said forward axle housing in vertical position below a vehicle.

14. A steerable dual rear axle assembly for large vehicles according to claim 13 including:
a second elongated panhard bar having first and second ends, the first end being pivotally connected to said rearward axle housing, the second end being pivotally connected to a vehicle frame, said second panhard bar being supported for pivotation in a vertical plane and serving to maintain said rearward axle housing in vertical position below a vehicle frame.

15. A steerable dual rear axle assembly for large vehicles according to claim 11 wherein said means of steerably pivoting said rearward axle housing relative to said forward axle housing comprises:
hydraulically actuatable cylinder-piston means.

16. A steerable dual rear axle system for large vehicles according to claim 15 wherein said hydraulically actuatable cylinder-piston means comprises:
a hydraulically actuatable cylinder-piston member having first and second ends, the first end being pivotally affixed to a first point of attachment on said forward axle housing and the second end being pivotally affixed at a second point of attachment adjacent one of said ends of said rearward axle housing.

17. A steerable dual rear axle assembly for large vehicles according to claim 16 including a second hydraulically actuatable cylinder-piston member having first and second ends, the first end being pivotally affixed to a first point of attachment on said forward axle housing and the second end being pivotally affixed at a second point of attachment adjacent the other of said ends of said rearward axle housing, the first and second cylinder-piston members functioning oppositely of each other to steerably pivot said rearward axle housing relative to said forward axle housing.

* * * * *